US010202137B2

(12) United States Patent
Okazaki et al.

(10) Patent No.: US 10,202,137 B2
(45) Date of Patent: Feb. 12, 2019

(54) HEATER DEVICE, STEERING WHEEL, AND TRANSPORT DEVICE

(71) Applicant: PANASONIC INTELLECTUAL PROPERTY MANAGEMENT CO., LTD., Osaka (JP)

(72) Inventors: Yuta Okazaki, Osaka (JP); Hiroshi Naitou, Osaka (JP); Shinji Fujikawa, Hiroshima (JP); Tsuyoshi Nishio, Chiba (JP); Nobuharu Katsuki, Kyoto (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 60 days.

(21) Appl. No.: 15/327,488

(22) PCT Filed: Jul. 16, 2015

(86) PCT No.: PCT/JP2015/003585
§ 371 (c)(1),
(2) Date: Jan. 19, 2017

(87) PCT Pub. No.: WO2016/013180
PCT Pub. Date: Jan. 28, 2016

(65) Prior Publication Data
US 2017/0183025 A1 Jun. 29, 2017

(30) Foreign Application Priority Data

Jul. 23, 2014 (JP) .................................. 2014-149647

(51) Int. Cl.
*B62D 1/06* (2006.01)
(52) U.S. Cl.
CPC ............... *B62D 1/06* (2013.01); *B62D 1/065* (2013.01)

(58) Field of Classification Search
CPC . B62D 1/065; B62D 1/06; B62D 1/08; H05B 1/0236; H05B 3/0042; H05B 3/34;
(Continued)

(56) References Cited

U.S. PATENT DOCUMENTS

2002/0170900 A1   11/2002   Braeuchle et al.

FOREIGN PATENT DOCUMENTS

| JP | S61-218475 A | 9/1986 |
| JP | 2002-340712 A | 11/2002 |

(Continued)

OTHER PUBLICATIONS

International Search Report and Written Opinion issued in International Patent Application No. PCT/JP2015/003585, dated Sep. 8, 2015; with partial English translation.

*Primary Examiner* — Shawntina Fuqua
(74) *Attorney, Agent, or Firm* — Greenblum & Bernstein, P.L.C.

(57) ABSTRACT

A heater device includes: a base member; a heater wire; and a sensor which measures capacitance of the heater wire, wherein the heater wire forms a first wiring pattern and a second wiring pattern connected in series, the first wiring pattern and the second wiring pattern each include N wire blocks, the N wire blocks included in the first wiring pattern and the second wiring pattern are disposed in a manner that arrangement of the N wire blocks included in the first wiring pattern and arrangement of the N wire blocks included in the second wiring pattern are reversed in the circumferential direction of the rim and facing each other in a direction perpendicular to the circumferential direction, and a sum of sensitivity of the sensor to capacitance of a pair of wire blocks facing each other is substantially equal to that of another pair.

12 Claims, 14 Drawing Sheets

(58) Field of Classification Search
CPC ........ H05B 2203/013; H05B 2203/004; H05B 2203/002
See application file for complete search history.

(56) References Cited

FOREIGN PATENT DOCUMENTS

| | | |
|---|---|---|
| JP | 2011-121477 A | 6/2011 |
| WO | 2015/040864 A1 | 3/2015 |

…

HEATER DEVICE, STEERING WHEEL, AND TRANSPORT DEVICE

RELATED APPLICATIONS

This application is the U.S. National Phase under 35 U.S.C. § 371 of International Patent Application No. PCT/JP2015/003585, filed on Jul. 16, 2015, which in turn claims the benefit of Japanese Application No. 2014-149647, filed on Jul. 23, 2014, the disclosures of which Applications are incorporated by reference herein.

TECHNICAL FIELD

The present invention relates to a heater device, a steering wheel which includes the heater device, and a transport device which includes the steering wheel.

BACKGROUND ART

In recent years, in order to prevent accidents caused by vehicles such as cars, and transport devices such as railways, aircrafts, and vessels for transporting individuals and cargoes, there is an increasing need for a device which detects whether an operator of the transport device is falling asleep.

For example, Patent Literature (PTL) 1 discloses a technology for continuously monitoring contact between the operator's hand and a steering wheel of a vehicle by using a heater included in the steering wheel.

Also for example, PTL 2 discloses a heater device for a steering wheel, which is characterized by a wiring pattern in which a cord-shaped heater is disposed on the base member.

CITATION LIST

Patent Literature

PTL 1: Japanese Unexamined Patent Application Publication No. 2002-340712
PTL 2: Japanese Unexamined Patent Application Publication No. 2011-121477

SUMMARY OF THE INVENTION

Technical Problem

PTL 1 discloses the technology for detecting whether an operator is holding the steering wheel by using the heater included in the steering wheel, but fails to disclose what specifically the heater is.

Solution to Problem

A heater device according to the first aspect of the present invention is a heater device disposed on a steering wheel which includes a rim, the heater device including: a base member attached to the rim; a heater wire disposed on the base member; and a sensor which is connected to one of a leading end and a trailing end of the heater wire and measures capacitance of the heater wire, wherein the heater wire forms a first wiring pattern and a second wiring pattern which are connected in series, the first wiring pattern and the second wiring pattern each include N wire blocks connected in series, where N is an integer greater than or equal to 2, the N wire blocks included in the first wiring pattern and the N wire blocks included in the second wiring pattern are (a) disposed along a first direction, which is a circumferential direction of the rim, in a manner that arrangement of the N wire blocks included in the first wiring pattern from the leading end of the heater wire to the trailing end and arrangement of the N wire blocks included in the second wiring pattern from the leading end of the heater wire to the trailing end are reversed, and (b) facing each other in a second direction perpendicular to the first direction, and among the N wire blocks included in the first wiring pattern and the N wire blocks included in the second wiring pattern, a sum of sensitivity of the sensor to capacitance of a pair of wire blocks facing each other is substantially equal to a sum of sensitivity of the sensor to capacitance of another pair of wire blocks facing each other.

A heater device according to the second aspect of the present invention is a heater device which is disposed on a steering wheel which includes a rim and a spoke connected to the rim, the heater device including: a base member; a wiring pattern formed of a heater wire and disposed on the base member; and a sensor which is connected to one of a leading end and a trailing end of the heater wire, and measures capacitance of the heater wire, wherein the wiring pattern includes a spoke wiring pattern disposed on the spoke, and a rim-portion wiring pattern by the heater wire being repeatedly folded in a first direction, which is a circumferential direction of the rim, and a direction opposite the first direction and extended along a second direction perpendicular to the first direction or a direction opposite the second direction, and the spoke wiring pattern is away from the one of the leading end and the trailing end of the heater wire which is connected to the sensor.

Advantageous Effect of Invention

According to the present invention, a heater device, a steering wheel, and a transport device which have improved accuracy in detecting whether an operator is holding the steering wheel are provided.

DESCRIPTION OF EXEMPLARY EMBODIMENTS

Figure 13:
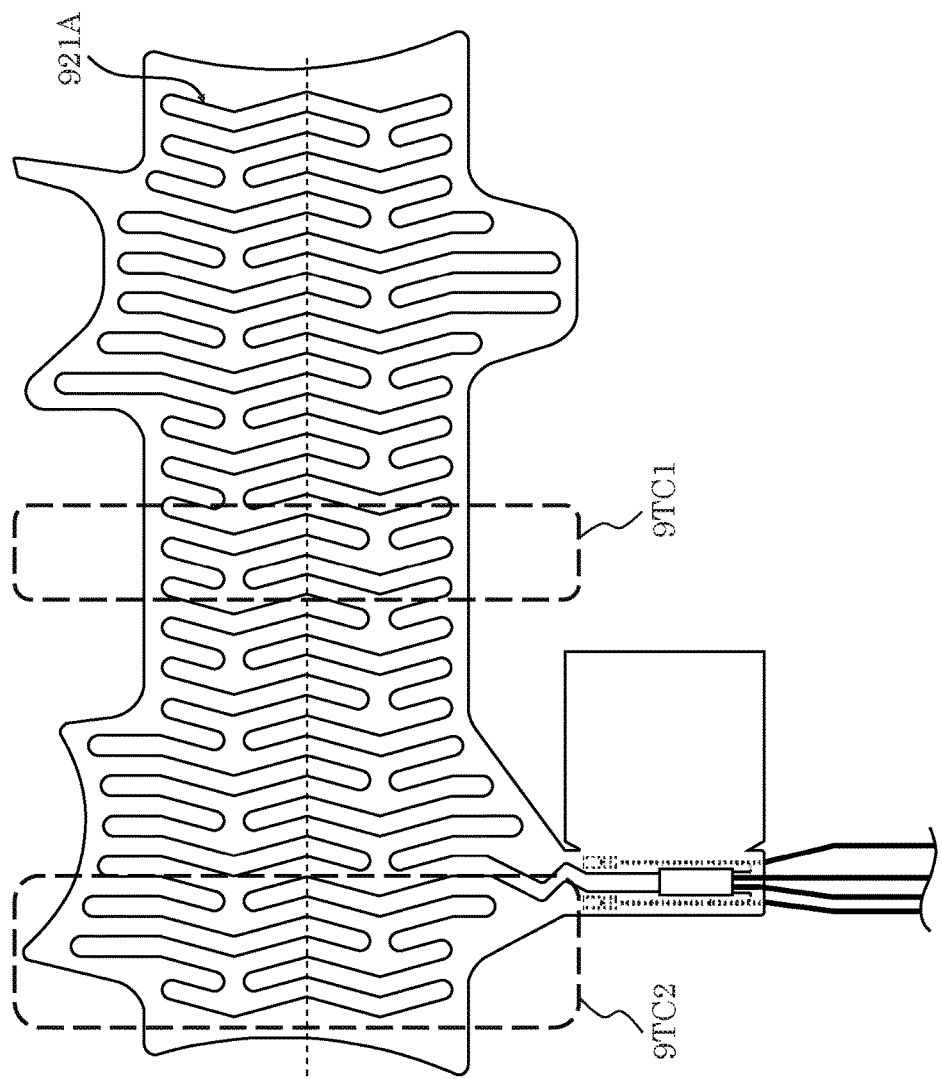
FIG. 13 is a diagram for illustrating a wiring pattern of a heater device according to a conventional technology.

Prior to describing embodiments according to the present invention, problems with the conventional configuration are described now. FIG. 13 is a plan view of configuration of the heater device disclosed in PTL 2. Application of the heater device having the wiring pattern illustrated in FIG. 13 to the heater disclosed in PTL 1 allows detection of the contact between the operator's hand and the steering wheel. In this case, however, capacitance of wiring pattern 921A depends on a portion of the steering wheel which is in contact with the operator's hand, that is, a portion of the heater over which the operator's hand is placed, which ends up changing a frequency difference to be detected.

Even if the contact between the hand and the steering wheel is detected by a capacitance difference rather than by a frequency difference, the impedance of the capacitance measured by a sensor depends on a portion of the steering wheel which is in contact with the operator's hand. Thus, when the operator is holding a different portion of the steering wheel but in the same holding state, a different amount of increase in capacitance results. It should be noted that the "holding state," as used herein, refers to how much contact area with which the operator's hand is in contact with the steering wheel.

An amount of increase in capacitance measured by the sensor is different when the steering wheel is held by the operator placing the hand over area 9TC1 in FIG. 13 and when the steering wheel is held by the operator in the same manner but placing the hand over area 9TC2, for example.

Thus, even a combination of the techniques disclosed in PTL 1 and PTL 2 yields a sensing device which has low accuracy in detecting whether an operator is holding a steering wheel. Hereinafter, configurations of a heater device, a steering wheel, and a transport device which solve such a problem are described.

The heater device according to the first aspect of the present invention is a heater device disposed on a steering wheel which includes a rim, the heater device including: a base member attached to the rim; a heater wire disposed on the base member; and a sensor which is connected to one of a leading end and a trailing end of the heater wire and measures capacitance of the heater wire, wherein the heater wire forms a first wiring pattern and a second wiring pattern which are connected in series, the first wiring pattern and the second wiring pattern each include N wire blocks connected in series, where N is an integer greater than or equal to 2, the N wire blocks included in the first wiring pattern and the N wire blocks included in the second wiring pattern are (a) disposed along a first direction, which is a circumferential direction of the rim, in a manner that arrangement of the N wire blocks included in the first wiring pattern from the leading end of the heater wire to the trailing end and arrangement of the N wire blocks included in the second wiring pattern from the leading end of the heater wire to the trailing end are reversed, and (b) facing each other in a second direction perpendicular to the first direction, and among the N wire blocks included in the first wiring pattern and the N wire blocks included in the second wiring pattern, a sum of sensitivity of the sensor to capacitance of a pair of wire blocks facing each other is substantially equal to a sum of sensitivity of the sensor to capacitance of another pair of wire blocks facing each other.

A heater device according to the second aspect of the present invention is the heater device according to the first aspect, wherein the wire blocks are arranged by the heater wire being repeatedly folded in the first direction and a direction opposite the first direction and extended in the second direction or a direction opposite the second direction.

A heater device according to the third aspect of the present invention is the heater device according to the first aspect, wherein the heater wire further forms a spoke wiring pattern disposed on a spoke of the steering wheel, in addition to the first wiring pattern and the second wiring pattern, the spoke wiring pattern being away from the one of the leading end and the trailing end of the heater wire which is connected to the sensor.

A fourth aspect of the present invention is directed to a steering wheel which includes the heater device according to one of the first aspect, second aspect, and third aspect.

A steering wheel according to the fifth aspect of the present invention is the steering wheel according to the fourth aspect, wherein the first wiring pattern of the heater device is disposed on a back side of the rim, the back side not facing an operator of the steering wheel.

A heater device according to the sixth aspect of the present invention is a heater device which is disposed on a steering wheel which includes a rim and a spoke connected to the rim, the heater device including: a base member; a wiring pattern formed of a heater wire and disposed on the base member; and a sensor which is connected to one of a leading end and a trailing end of the heater wire, and measures capacitance of the heater wire, wherein the wiring pattern includes a spoke wiring pattern disposed on the spoke, and a rim-portion wiring pattern by the heater wire being repeatedly folded in a first direction, which is a circumferential direction of the rim, and a direction opposite the first direction and extended along a second direction perpendicular to the first direction or a direction opposite the second direction, and the spoke wiring pattern is away from the one of the leading end and the trailing end of the heater wire which is connected to the sensor.

The steering wheel according to the seventh aspect of the present invention includes the heater device according to the sixth aspect.

The eighth aspect of the present invention is directed to a transport device which includes the steering wheel according to one of the fourth aspect, fifth aspect, and seventh aspect.

The embodiments described below are each merely illustration of the present invention. Values, shapes, materials, components, arrangement and connection between the components, and steps and the order of the steps shown in the following embodiments are merely illustrative and not intended to limit the present invention. The present invention is indicated by the appended claims. Therefore, among the components in the embodiment below, components not recited in any one of the independent claims indicating the most generic part of the inventive concept of the present invention are not necessary to achieve the present invention, but are described as components for preferable embodiments.

It should be noted that a vehicle is described as an example of the transport device.

Embodiment 1

Figure 1:
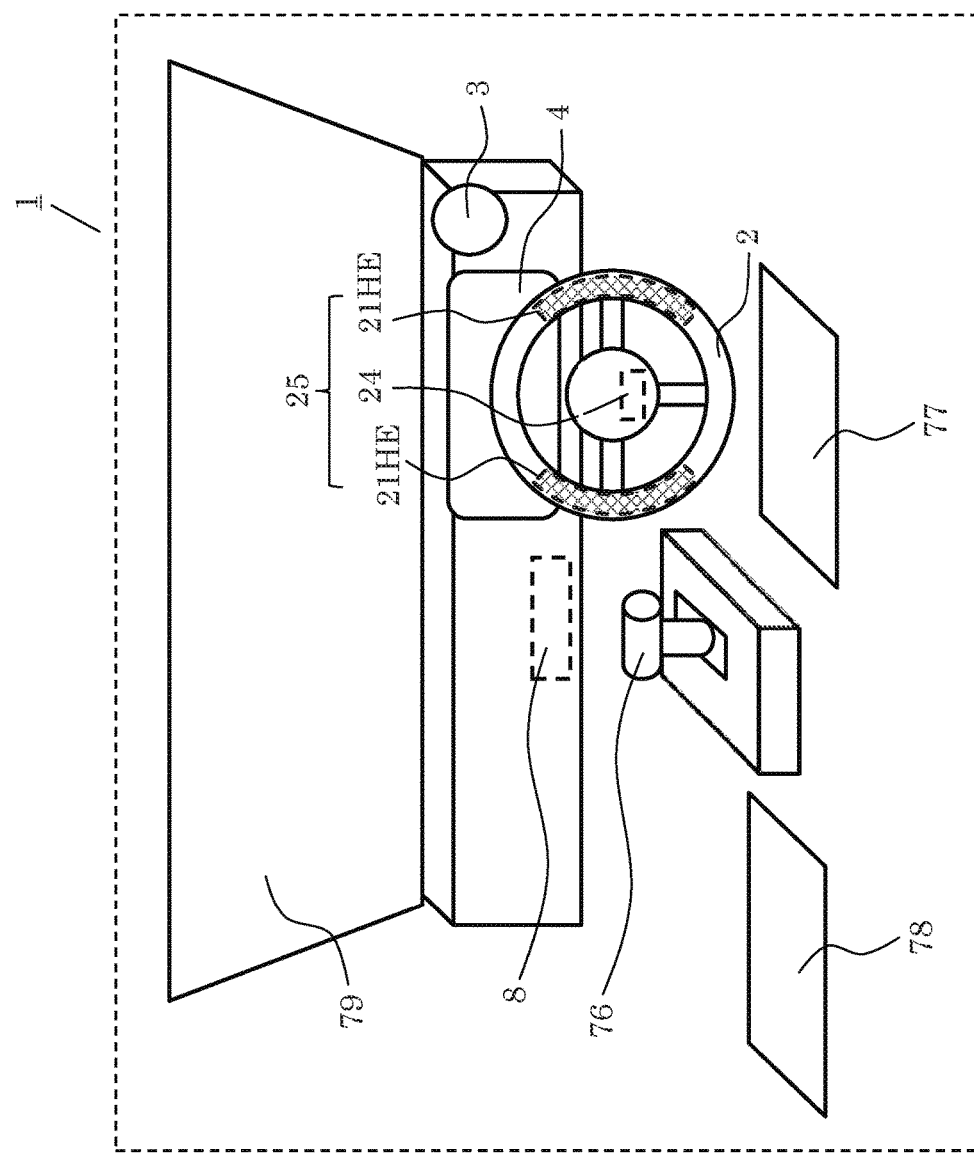
FIG. 1 is a schematic view of a steering wheel according to Embodiment 1, and peripheral components thereof which are installed in a vehicle.

FIG. 1 is a schematic view of a steering wheel according to Embodiment 1 of the present invention and peripheral components thereof which are installed in a vehicle. Vehicle 1 includes steering wheel 2, loudspeaker 3, display device 4 such as a liquid crystal display, shift lever 76, driver seat 77, passenger seat 78, second controller 8, and windshield 79. Loudspeaker 3 and display device 4 are, by way of example, alerting devices. Steering wheel 2 has heater device 25 incorporated therein. Heater device 25 includes two heater elements 21HE, and first controller 24. First controller 24 is electrically connected to second controller 8 via a connecting line not shown. Second controller 8 is electrically connected to loudspeaker 3 and display device 4 via connecting lines not shown.

Figure 2A:
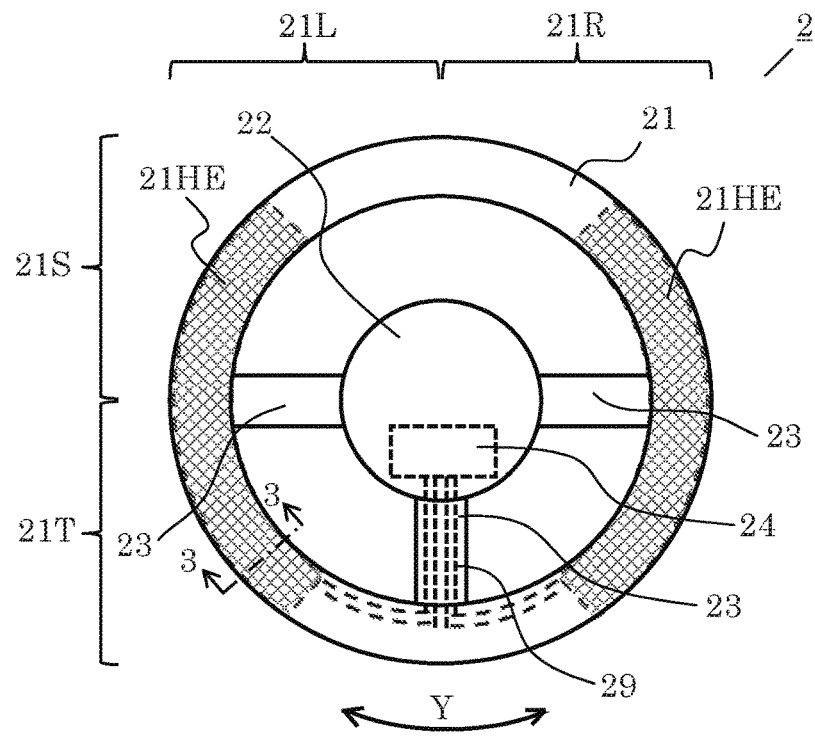
FIG. 2A is a front view of the steering wheel according to Embodiment 1.
Figure 2B:
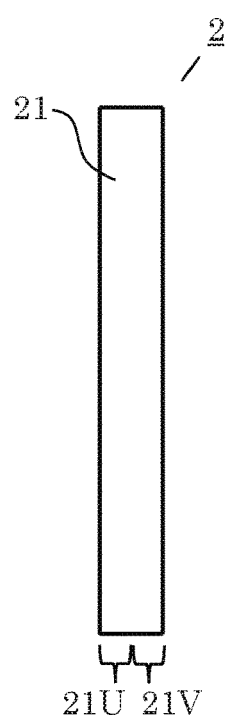
FIG. 2B is a side view of the steering wheel according to Embodiment 1.

FIG. 2A is a front view of steering wheel 2. FIG. 2B is a right side view of steering wheel 2. Steering wheel 2 includes rim 21 having a ring shape, pad 22 located in the center of steering wheel 2, and spokes 23 coupling rim 21 and pad 22. Heater elements 21HE are embedded in rim 21. First controller 24 is disposed within pad 22. Connecting lines 29 are disposed within one of three spokes 23. Two heater elements 21HE are electrically connected to first controller 24 via connecting lines 29.

The upper region and lower region of rim 21 when steering wheel 2 is in a neutral position are referred to as upper portion 21S and lower portion 21T, respectively. The right region and left region of rim 21 as viewed by the operator of steering wheel 2 when steering wheel 2 is in the neutral position are referred to as right portion 21R and left portion 21L, respectively. The region of rim 21 facing the operator of steering wheel 2 when steering wheel 2 is in the neutral position is referred to as front portion 21U, and the region opposite front portion 21U is referred to as back portion 21V.

It should be noted that the "neutral position" in the present embodiment refers to a position of steering wheel 2 (position at which the steering angle is 0 degree) when steered so that vehicle 1 travels in a straight line. The "neutral position" refers to the position of steering wheel 2 when steered so that the transport device, not limiting to vehicle 1, travels in a straight line.

Figure 3:
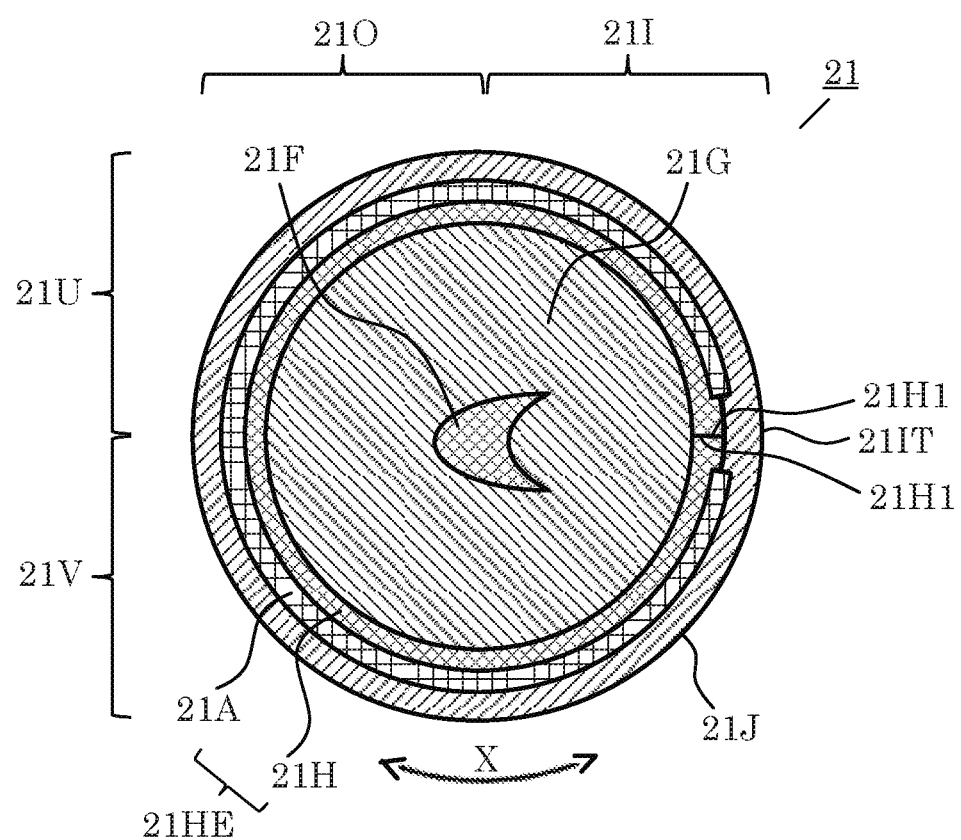
FIG. 3 is a cross-sectional view of a rim of the steering wheel according to Embodiment 1.

FIG. 3 is a cross-sectional view of rim 21 taken along 3-3 shown in FIG. 2A. In FIG. 3, the inner radial region of rim 21 is referred to as inner-radial portion 21I, and the outer radial region of rim 21 is referred to as outer-radial portion 21O. Rim 21 includes core member 21F made of metal, resin layer 21G coating core member 21F, and heater elements 21HE. Heater elements 21HE are each configured of nonwoven fabric 21H, which is a base member, and wiring pattern 21A of a heater wire sewn over nonwoven fabric 21H. Heater elements 21HE are adhesively bonded to resin layer 21G so as to wrap around resin layer 21G. Rim 21 further includes surface layer 21J made of, for example, leather, wood, or resin. Surface layer 21J is coating heater elements 21HE.

It should be noted that, for ease of understanding of the embedment of wiring pattern 21A of heater element 21HE, FIG. 3 depicts parts in solid lines, which should be depicted in dotted lines since they are hidden by nonwoven fabric 21H. Moreover, the thicknesses of nonwoven fabric 21H and wiring pattern 21A are deformed for the sake of simplicity. Wiring pattern 21A is embedded under surface layer 21J of rim 21.

Figure 4:
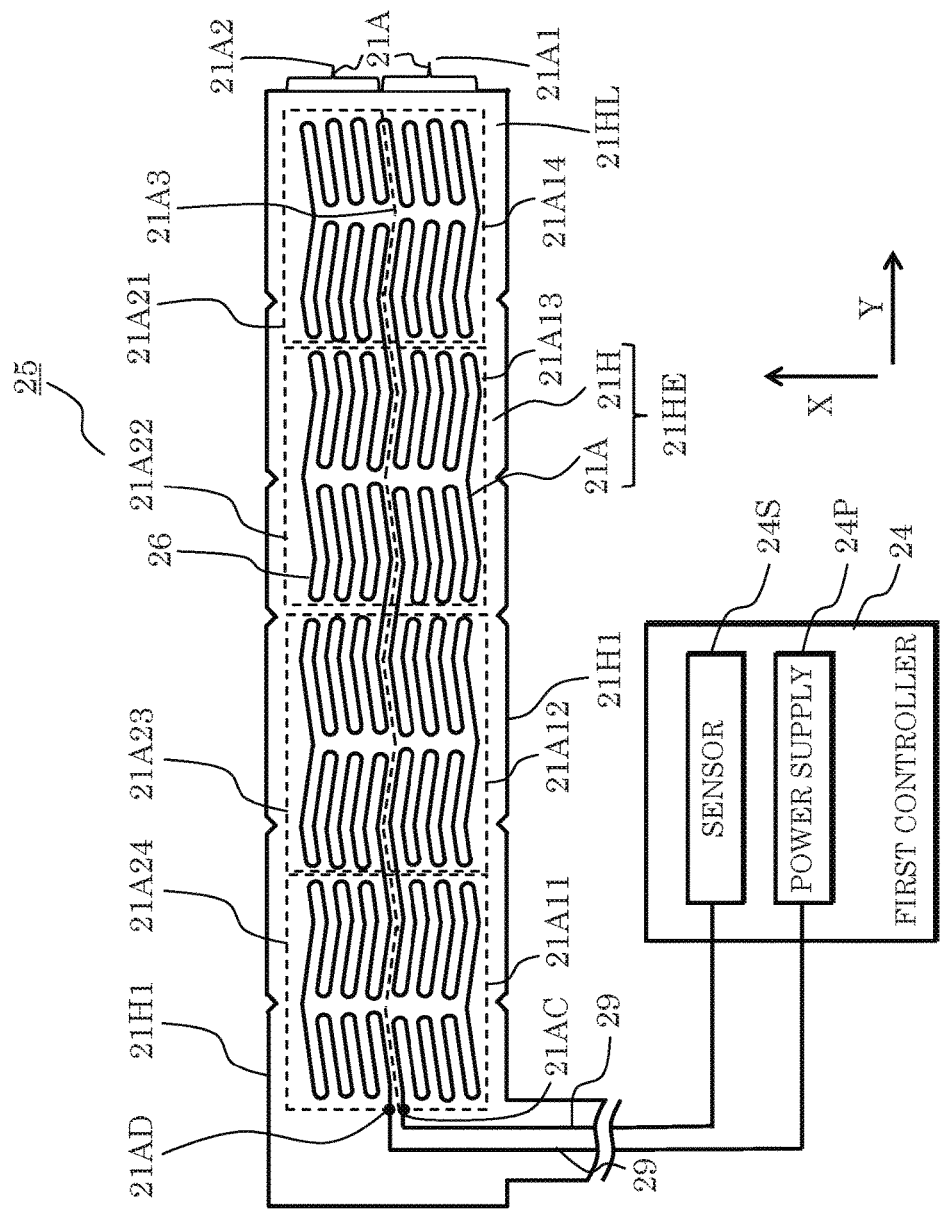
FIG. 4 is a diagram for illustrating wiring paths of a wiring pattern of a heater device according to Embodiment 1.

FIG. 4 is a diagram for illustrating wiring pattern 21A of heater elements 21HE included in heater device 25 according to the present embodiment. In the present embodiment, wiring pattern 21A of heater elements 21HE for warming steering wheel 2 is also utilized to detect contact of the operator's hand with steering wheel 2. Wiring pattern 21A is configured of one heater wire 26 which is repeatedly folded and disposed on nonwoven fabric 21H. Here, heater wire 26 may be one line made up of thin metallic wires cabled together. Heater wire 26 of wiring pattern 21A is sewn over nonwoven fabric 21H to be integrated with nonwoven fabric 21H and form heater elements 21HE.

Wiring pattern 21A is accurately placed on nonwoven fabric 21H to achieve a uniform temperature distribution. Heater elements 21HE accurately placed on wiring pattern 21A in this manner are embedded under surface layer 21J of rim 21, thereby improving accuracy in measuring capacitance (described below) of wiring pattern 21A.

It should be noted that the present embodiment is to be described by defining the circumferential direction of rim 21 as a first direction (hereinafter, referred to as Y direction), and a direction perpendicular to the first direction as a second direction (hereinafter, referred to as X direction).

In FIG. 4, left-side nonwoven fabric portion 21HL is a portion of nonwoven fabric 21H and adhesively bonded to a portion of resin layer 21G which is on left portion 21L of rim 21 when steering wheel 2 is in the neutral position. Left-side nonwoven fabric portion 21HL is adhesively bonded to resin layer 21G, having ends 21H1 of left-side nonwoven fabric portion 21HL in X direction placed in the vicinity of top 21IT of inner-radial portion 21I as seen in FIG. 3.

As illustrated in FIG. 4, first controller 24 includes sensor 24S for measuring the capacitance of wiring pattern 21A, and power supply 24P which controls supply of power to heater wire 26. Along wiring paths between wiring pattern 21A and first controller 24, wiring pattern 21A has sensor-side end 21AC connected to sensor 24S, and opposite end 21AD which is an opposite end of wiring pattern 21A relative to sensor-side end 21AC. It should be noted that the circuit included in sensor 24S and power supply 24P are commonly grounded, and thus the notation of the ground is omitted in FIG. 4.

Wiring pattern 21A includes first wiring pattern 21A1 and second wiring pattern 21A2 which are connected in series. First wiring pattern 21A1 includes wire blocks 21A11, 21A12, 21A13, and 21A14 connected in series. Second wiring pattern 21A2 includes wire blocks 21A21, 21A22, 21A23, and 21A24 connected in series. First wiring pattern 21A1 and second wiring pattern 21A2 are disposed facing each other in X direction via boundary 21A3 extending substantially in Y direction.

Figure 5:
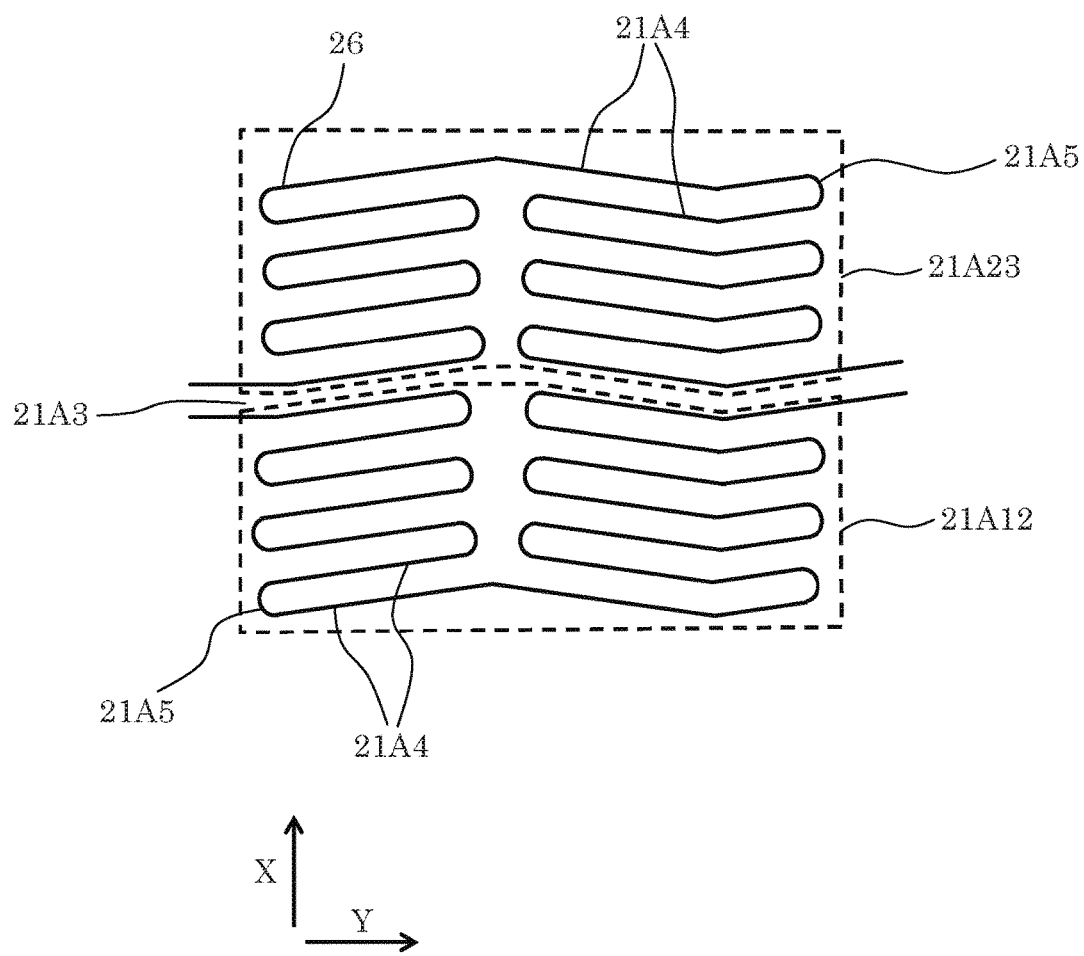
FIG. 5 is a diagram for illustrating wire blocks included in the wiring pattern of the heater device according to Embodiment 1.

FIG. 5 is an example of a magnified view of the pair of wire blocks 21A12 and 21A23 which are facing each other in X direction in FIG. 4. Wire blocks 21A12 and 21A23 are described below with reference to FIG. 5.

Wire block 21A12 is included in first wiring pattern 21A1 at a position closer to sensor-side end 21AC than opposite end 21AD along the wiring of wiring pattern 21A. Wire block 21A23 is included in second wiring pattern 21A2 at a position closer to opposite end 21AD than sensor-side end 21AC along the wiring of wiring pattern 21A.

Wire blocks 21A12 and 21A23 are each formed of a pattern created by folds 21A4 coupled one another at turns 21A5 and extending in X direction and an opposite direction of X direction. Folds 21A4 are each extending so that an angle between fold 21A4 and Y direction is smaller than an angle between fold 21A4 and X direction.

As illustrated in FIG. 4, heater wire 26 of wire block 21A11, which is at the left end of first wiring pattern 21A1 and begins at sensor-side end 21AC, extends in Y direction to form wire block 21A12 adjacent to wire block 21A11. Heater wire 26 further extends in Y direction to form wire block 21A13 adjacent to wire block 21A12. In this manner, wire blocks 21A11 to 21A14 are disposed side by side substantially in Y direction, thereby forming first wiring pattern 21A1. Heater wire 26 which forms wire block 21A14 at the right end of first wiring pattern 21A1 extends in X direction across boundary 21A3 to form wire block 21A21 included in second wiring pattern 21A2.

Heater wire 26 extends from wire block 21A21 at the right end of second wiring pattern 21A2 in an opposite direction of Y direction to wire block 21A22 to form wire block 21A22. In this manner, wire blocks 21A21 to 21A24 are disposed side by side in the opposite direction of Y direction, across boundary 21A3 from first wiring pattern 21A1, thereby forming second wiring pattern 21A2. Heater wire 26 ends at opposite end 21AD in wire block 21A24 at the left end of second wiring pattern 21A2.

Sensor-side end 21AC is provided at one edge, in Y direction, of wire block 21A11 at the left end of first wiring pattern 21A1. Opposite end 21AD is provided at one edge, in Y direction, of wire block 21A24 at the left end of second wiring pattern 21A2. Sensor-side end 21AC is an edge of folds 21A4 of first wiring pattern 21A1 in Y direction. Opposite end 21AD is an edge, in Y direction, of folds 21A4 of second wiring pattern 21A2. Sensor-side end 21AC and opposite end 21AD are each connected to connecting line 29 connected to first controller 24.

Figure 6:
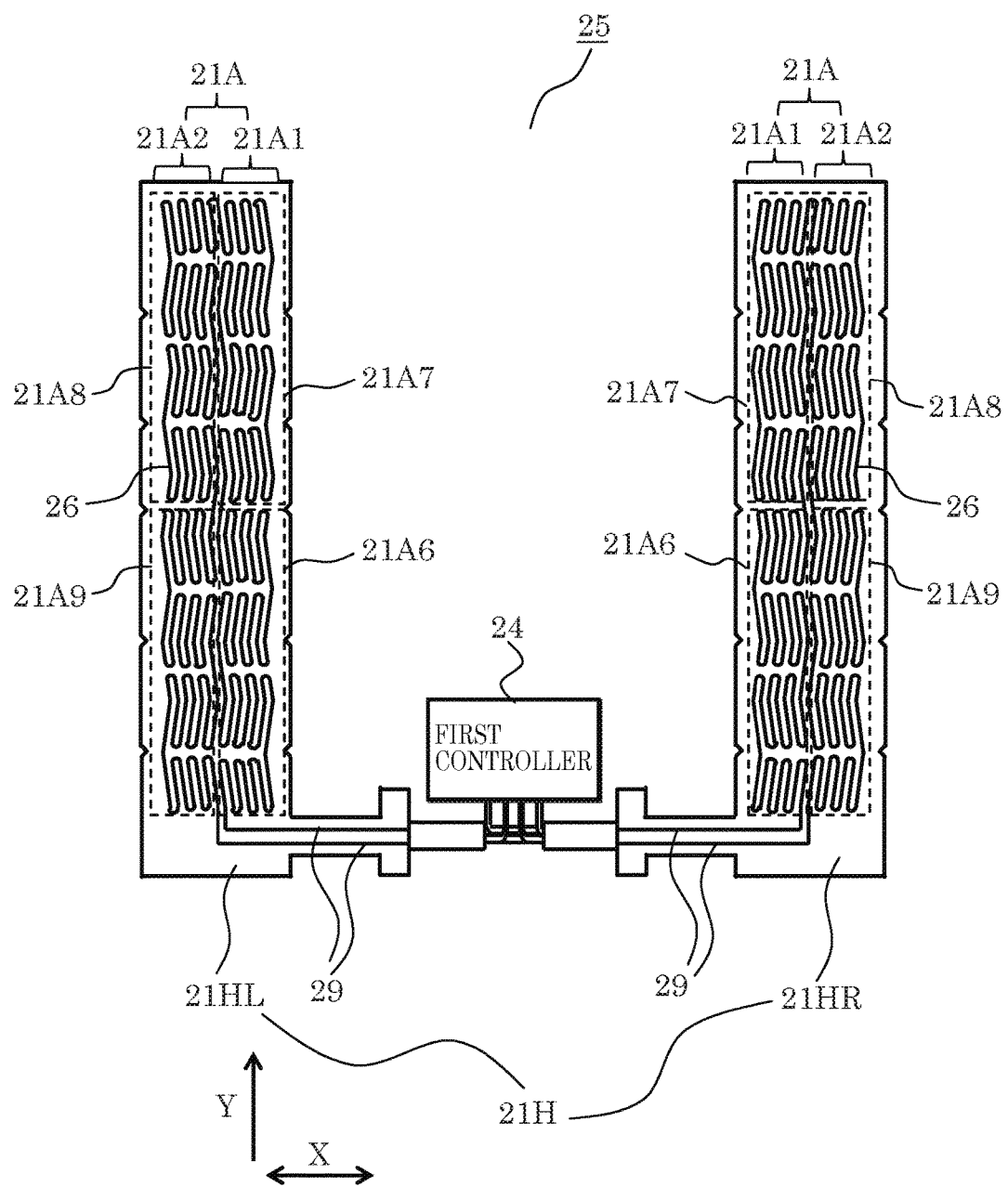
FIG. 6 is a diagram for illustrating the heater device according to Embodiment 1.

FIG. 6 is a front view of heater device 25 according to the present embodiment. Left-side nonwoven fabric portion 21HL described with reference to FIG. 4 is disposed on the left side of first controller 24 in the figure. First controller 24 and wiring pattern 21A of left-side nonwoven fabric portion 21HL are electrically connected via connecting line 29. Right-side nonwoven fabric portion 21HR which is embedded in right portion 21R of rim 21 is disposed on the right side of first controller 24 in the figure. First controller 24 and wiring pattern 21A of right-side nonwoven fabric portion 21HR are electrically connected via connecting line 29. Right-side nonwoven fabric portion 21HR and left-side nonwoven fabric portion 21HL are in shapes that are line symmetry about the centerline of first controller 24. Likewise, wiring pattern 21A disposed on right-side nonwoven fabric portion 21HR and wiring pattern 21A disposed on left-side nonwoven fabric portion 21HL are in shapes that are line symmetry about the centerline of first controller 24.

In the present embodiment, nonwoven fabric 21H is split into two portions which are left-side nonwoven fabric portion 21HL and right-side nonwoven fabric portion 21HR each of which includes wiring pattern 21A. For that reason, compared to disposing all wiring patterns 21A on one nonwoven fabric 21H without being split, nonwoven fabric 21H is easily wrapped around resin layer 21G of rim 21. It should be noted that, not limiting to be split into two portions, nonwoven fabric 21H may be one nonwoven fabric or may be split into three or more portions.

Figure 7A:
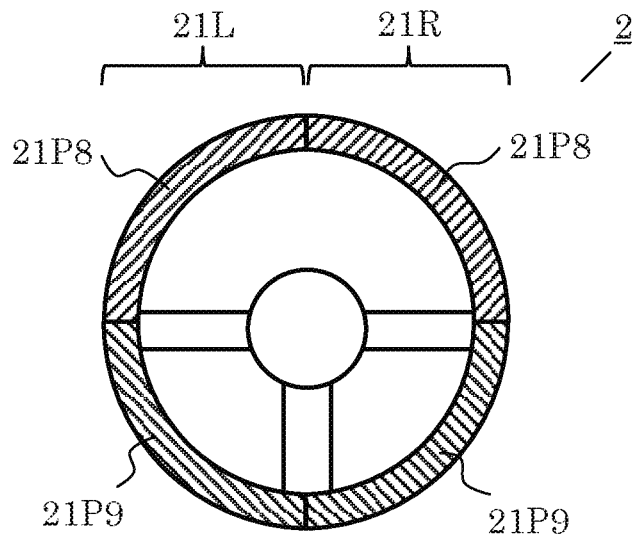
FIG. 7A is a diagram for illustrating an embedded position, in the steering wheel, of the wiring pattern of the heater device according to Embodiment 1.
Figure 7B:
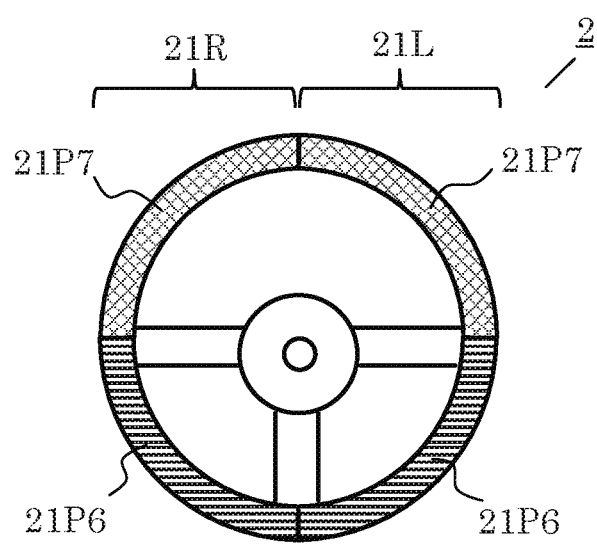
FIG. 7B is a diagram for illustrating an embedded position, in the steering wheel, of the wiring pattern of the heater device according to Embodiment 1.
Figure 7C:
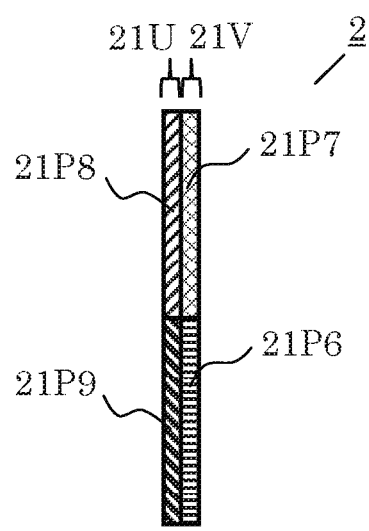
FIG. 7C is a diagram for illustrating the embedded position, in the steering wheel, of the wiring pattern of the heater device according to Embodiment 1.

FIGS. 7A, 7B, and 7C are diagrams for illustrating which portion of wiring pattern 21A is embedded in which portion of rim 21. FIGS. 7A, 7B, and 7C respectively illustrate the front face, back face, and right-side face of steering wheel 2. In the present embodiment, wire blocks 21A6 and 21A7 included in first wiring pattern 21A1 and wire blocks 21A8 and 21A9 included in second wiring pattern 21A2 of wiring pattern 21A in left-side nonwoven fabric portion 21HL in FIG. 6 are embedded in respective portions 21P6, 21P7, 21P8, and 21P9 of left portion 21L of rim 21 illustrated in FIGS. 7A and 7B. Wire blocks 21A6 and 21A7 and wire blocks 21A8 and 21A9, which are respectively included in first wiring pattern 21A1 and second wiring pattern 21A2 of wiring pattern 21A in right-side nonwoven fabric portion 21HR in FIG. 6, are embedded in respective portions 21P6, 21P7, 21P8, and 21P9 of right portion 21R of rim 21 illustrated in FIGS. 7A and 7B.

It should be noted that wire blocks 21A6 to 21A9 in left-side nonwoven fabric portion 21HL and right-side nonwoven fabric portion 21HR are each indicated by a dotted box in FIG. 6 for ease of understanding. In FIGS. 7A, 7B, and 7C, rim 21 is hatched in different manners to clarify the ranges of portions 21P6, 21P7, 21P8, and 21P9.

The principle of operation of heater device 25 according to the present embodiment is now described. Heater device 25 has capacitance between wiring pattern 21A and the ground of a metal member and the like within steering wheel 2. As the operator's hand comes in contact with steering wheel 2, the capacitance between wiring pattern 21A and the hand increases. Thus, capacitance of wiring pattern 21A detected by sensor 24S increases. In first controller 24, sensor 24S measures the capacitance of wiring pattern 21A.

First controller 24 generates an analog voltage signal (first signal SG1) according to a magnitude of the capacitance measured by sensor 24S. Then, second controller 8 continuously monitors first signal SG1 to calculate an amount of increase in capacitance and determine whether the operator's hand is in contact with steering wheel 2. It should be noted that the greater the area of rim 21 covered with the operator's hand, the greater the amount of increase in capacitance.

Figure 8:
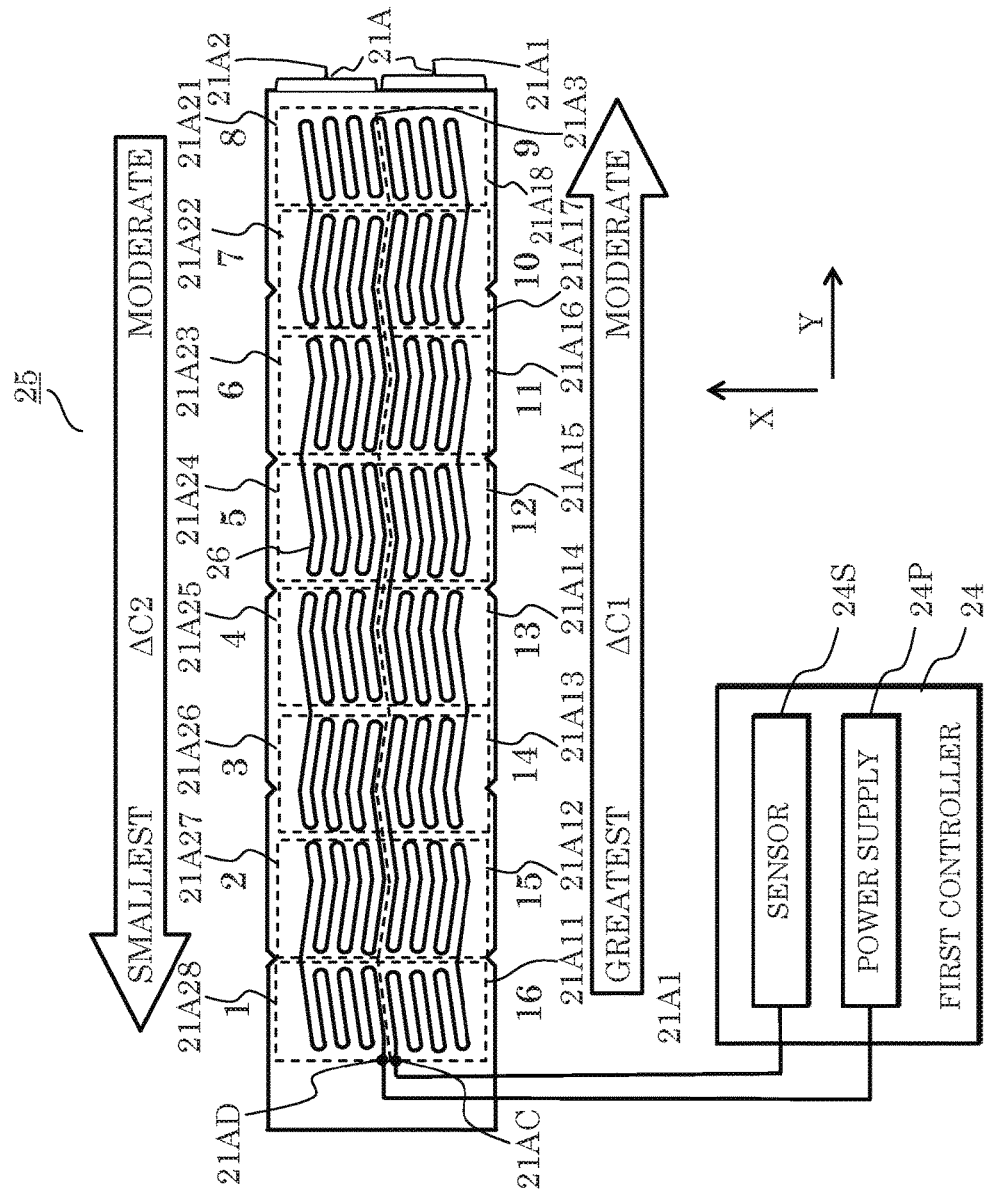
FIG. 8 is a diagram for illustrating the principle of operation of the heater device according to Embodiment 1.

FIG. 8 is a diagram for illustrating that the amount of increase in capacitance is constant throughout steering wheel 2, irrespective of a portion of steering wheel 2 over which the hand is placed, provided that the holding state of the operator over steering wheel 2 is constant. Here, wire blocks 21A11 to 21A14 illustrated in FIG. 4 are each further split into two in Y direction to provide wire blocks 21A11, 21A12, 21A13, 21A14, 21A15, 21A16, 21A17, and 21A18. Likewise, wire blocks 21A21 to 21A24 illustrated in FIG. 4 are further split into two in Y direction to provide wire blocks 21A21, 21A22, 21A23, 21A24, 21A25, 21A26, 21A27, and 21A28. The definition of wiring pattern 21A which includes first wiring pattern 21A1 and second wiring pattern 21A2 mentioned above still applies to wire blocks 21A11 to 21A18 and wire blocks 21A21 to 21A28 which are provided respectively by further splitting wire blocks 21A11 to 21A14 and wire blocks 21A21 to 21A24.

In other words, first wiring pattern 21A1 and second wiring pattern 21A2 included in various types of wiring pattern 21A are, generally, each formed of N wire blocks connected in series, where N is an integer greater than or equal to 2. For example, N=4 for wiring pattern 21A in FIG. 4, and N=8 for wiring pattern 21A in FIG. 8.

The numeric values (1 to 16) shown in FIG. 8 each indicate an amount of increase in capacitance which is detected by sensor 24S when the operator's hand comes in contact with steering wheel 2. The numeric values are relative values in wire blocks 21A11 to 21A18 included in first wiring pattern 21A1, and wire blocks 21A21 to 21A28 included in second wiring pattern 21A2.

Assume that an amount of increase ΔC1 in capacitance detected by sensor 24S in wire block 21A11 is 16 which is a maximum, the wire block 21A11 being at the left end in the figure and closest to sensor 24S along the wiring of wiring pattern 21A. Amounts of increase ΔC1 in capacitance in wire blocks 21A11 to 21A18 included in first wiring pattern 21A1 decrease with an increased distance away from sensor 24S. Assume that an amount of increase ΔC1 in capacitance in wire block 21A18 at the left end of first wiring pattern 21A1 in the figure is 9.

Assume that an amount of increase ΔC2 in capacitance detected by sensor 24S in wire block 21A21 is 8, the wire block 21A21 being included in second wiring pattern 21A2 and farther away from sensor 24S than wire block 21A18 along the wiring of wiring pattern 21A. Amounts of increase ΔC2 in capacitance in wire blocks 21A21 to 21A28 included in second wiring pattern 21A2 decrease with an increased distance away from sensor 24S. Assume that an amount of increase ΔC2 in capacitance in wire block 21A28 at the left end of second wiring pattern 21A2 in the figure is 1 which is a minimum.

The block arrow in the lower portion of FIG. 8 indicates that the amounts of increase ΔC1 in capacitance, which are detected by sensor 24S in wire blocks 21A11 to 21A18 included in first wiring pattern 21A1, vary from a greatest value (16) to a moderate value (9) in the rightward direction in the orientation of the figure. The block arrow in the upper portion of the figure indicates that the amounts of increase ΔC2 in capacitance, which are detected by sensor 24S in wire blocks 21A21 to 21A28 included in second wiring pattern 21A2, vary from a moderate value (8) to a smallest value (1) in the leftward direction in the orientation of the figure.

When the operator holds steering wheel 2, the hand comes in contact with rim 21 at front portion 21U and back portion 21V substantially at the same location in Y direction. For example, since ΔC1 in wire block 21A11 is 16 and ΔC2 in wire block 21A28 is 1, when the hand is placed over wire blocks 21A11 and 21A28, the sum of amounts of increase in capacitance detected by sensor 24S is 17 (=16+1). In other words, when the hand is placed over a pair of wire blocks which are substantially at the same location in Y direction and facing each other across boundary 21A3, the sum of amounts of increase in capacitance detected by sensor 24S is the sum of ΔC1 and ΔC2, the sum being constantly 17 in any pair.

In the present embodiment, the impedance remains the same when the operator is placing the hand over any of the following pairs: the pair of wire block 21A11 and wire block 21A28; the pair of wire block 21A12 and wire block 21A27; the pair of wire block 21A13 and wire block 21A26; the pair of wire block 21A14 and 21A25; the pair of wire block 21A15 and 21A24; the pair of wire block 21A16 and 21A23; the pair of wire block 21A17 and 21A22; and the pair of wire block 21A18 and 21A21. As the operator holds steering wheel 2, the hand comes in contact with front portion 21U and back portion 21V of rim 21 simultaneously. Since the hand is simultaneously placed over first wiring pattern 21A1 and second wiring pattern 21A2, which are respectively closer to and farther away from sensor 24S along the wiring of wiring pattern 21A, the impedance remains the same no matter which pair of wire blocks the hand is placing over.

Since the impedance remains substantially constant, irrespective of a portion of rim 21 over which the hand is placed, the sum of amounts of increase in capacitance detected by sensor 24S is constant as well, irrespective of a portion of rim 21 over which the hand is placed, provided that the holding state of the operator over steering wheel 2 is constant.

When heater element 21HE is embedded in rim 21, the capacitance in each wire block depends on the position of the wire block. For that reason, the sum of amounts of increase in capacitance detected by sensor 24S with respect to a pair of wire blocks facing each other and that with respect to another pair of wire blocks facing each other are not necessarily the same, and they vary to some extent. However, even if the sum of the amounts of increase in capacitance detected by sensor 24S varies by, for example, about 20%, second controller 8 is able to correctly determine whether the operator's hand is in contact with steering wheel 2.

For that reason, wire blocks 21A11 to 21A18 included in first wiring pattern 21A1 and wire blocks 21A21 to 21A28 included in second wiring pattern 21A2 may not necessarily be the same pattern insofar as the sum of sensitivities of sensor 24S to capacitance in a pair of wire blocks facing each other is substantially equal to the sum of sensitivities of sensor 24S to capacitance in another pair of wire blocks facing each other. "Substantially equal" means that variations by about 20% are permissible.

In FIGS. 7A, 7B, and 7C, wire blocks 21A6 and 21A7 included in first wiring pattern 21A1 of wiring pattern 21A illustrated in FIG. 6 are disposed on the back side of rim 21. Wire blocks 21A8 and 21A9 included in second wiring pattern 21A2 of wiring pattern 21A are disposed on the front side of rim 21. The sensitivities of sensor 24S to capacitances in wire blocks 21A6 and 21A7 are higher than the sensitivities of sensor 24S to capacitances in wire blocks 21A8 and 21A9. If wire blocks 21A6 and 21A7 included in first wiring pattern 21A1 are disposed on front portion 21U of rim 21, the hand in contact with only front portion 21U of rim 21 results in sensor 24S detecting a relatively large amount of increase in capacitance. In that case, second controller 8 erroneously determines that the hand is holding steering wheel 2 firmly. Wire blocks 21A8 and 21A9 included in second wiring pattern 21A2 are disposed on front portion 21U of rim 21 to prevent such erroneous sensing. This allows prompting the operator to securely hold steering wheel 2.

However, the present embodiment is not limited to such a configuration. Wire blocks 21A6 and 21A7 included in first wiring pattern 21A1 and wire blocks 21A8 and 21A9 included in second wiring pattern 21A2 may be inverted. For example, the end of heater wire 26 may be connected to power supply 24P instead of being connected to sensor 24S, and second wiring pattern 21A2 may be disposed closer to sensor-side end 21AC than opposite end 21AD along the wiring of wiring pattern 21A. Thus, generally, sensor 24S which measures the capacitance of heater wire 26 is connected to the leading end or trailing end of heater wire 26.

When the operator is holding steering wheel 2 firmly, the contact area of the hand with back portion 21V of rim 21 is great. The contact area is small or zero otherwise. When the operator is holding steering wheel 2 firmly, an area of the hand in contact with back portion 21V is greater than an area of the hand in contact with front portion 21U. Thus, the accuracy in detecting the holding state of the operator over steering wheel 2 increases if first wiring pattern 21A1, the sensitivity of sensor 24S to which is high in detecting the contact of the hand, is embedded in back portion 21V of rim 21.

Moreover, first wiring pattern 21A1 may be mainly embedded in back portion 21V among front portion 21U facing the operator and back portion 21V of rim 21. It should be noted that the expression "first wiring pattern 21A1 is mainly embedded in back portion 21V among front portion 21U facing the operator and back portion 21V of rim 21" includes an aspect in which "first wiring pattern 21A1 is embedded only in back portion 21V among front portion 21U and back portion 21V of rim 21."

In the present embodiment, wiring pattern 21A is embedded in left portion 21L and right portion 21R of rim 21. Sensor 24S included in first controller 24 monitors an amount of increase in capacitance in wiring pattern 21A. This correctly detects a state in which the hand(s) is holding left portion 21L and/or right portion 21R of rim 21.

Figure 9:
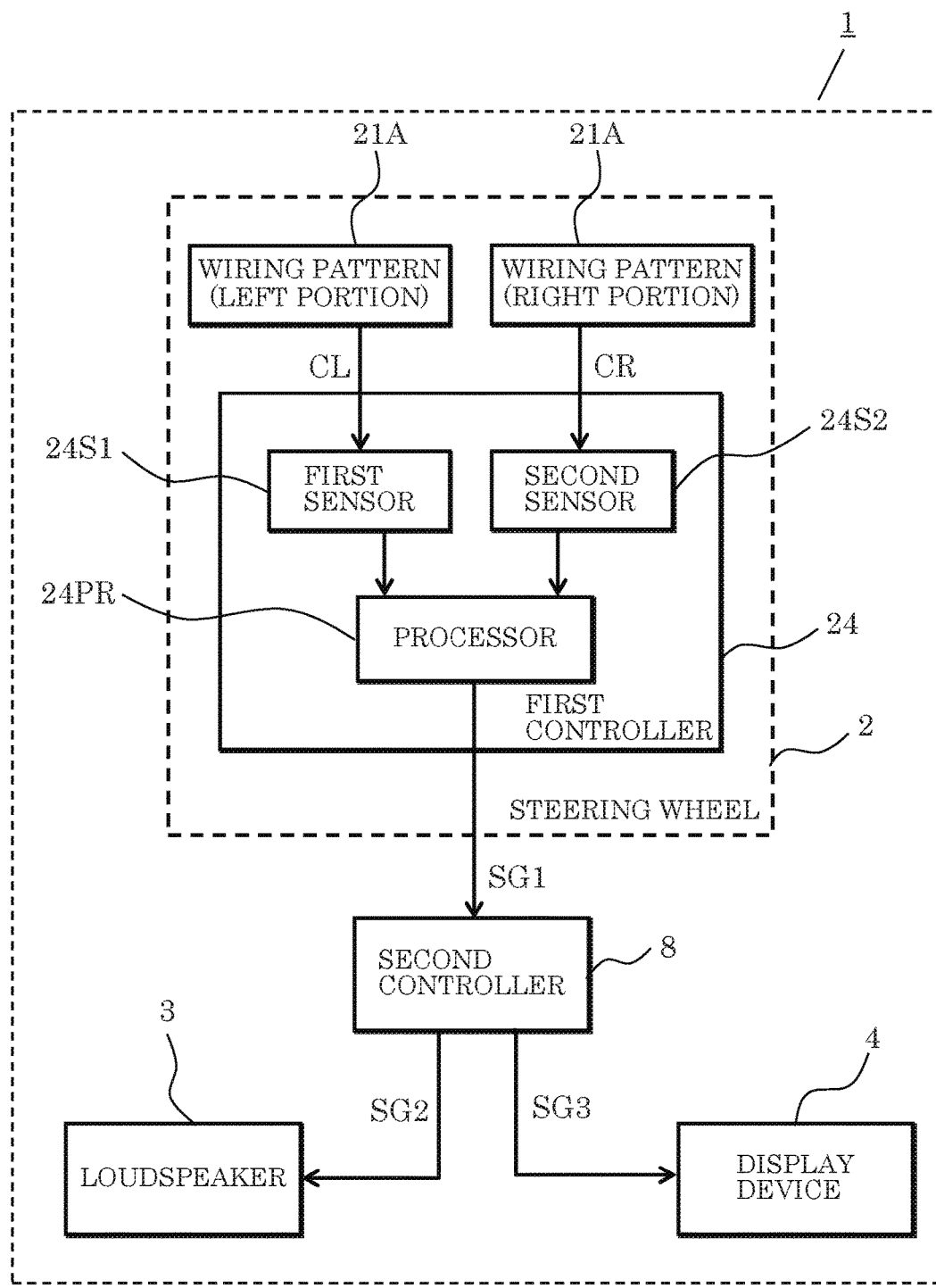
FIG. 9 is a block diagram of the vehicle according to Embodiment 1.

FIG. 9 is a block diagram of vehicle 1 according to the present embodiment. In first controller 24, first sensor 24S1 measures capacitance CL of wiring pattern 21A embedded in left portion 21L of rim 21. Second sensor 24S2 measures capacitance CR of wiring pattern 21A embedded in right portion 21R of rim 21. Then, processor 24PR generates an analog voltage signal (first signal SG1) according to a magnitude of capacitance CL or CR, and outputs the analog voltage signal to second controller 8 installed in vehicle 1. Second controller 8 determines a holding state of the operator's hand over steering wheel 2, based on first signal SG1 input from processor 24PR.

If second controller 8 determines that the holding state is not good, second controller 8 outputs second signal SG2 to loudspeaker 3 installed in vehicle 1, and outputs third signal SG3 to display device 4. Loudspeaker 3 having received second signal SG2 outputs a warning sound such as "please hold the steering wheel," for example. Display device 4 having received third signal SG3 displays a warning such as "please hold the steering wheel firmly for safety," for example.

According to heater device 25 and steering wheel 2 of the present embodiment, if the holding state of the operator over steering wheel 2 is constant, the amount of increase in capacitance detected by sensor 24S is constant as well, irrespective of a portion of rim 21 over which the hand is placed. This improves accuracy in detecting the holding state of the operator's hand over steering wheel 2. Moreover, since vehicle 1 which includes steering wheel 2 according to the present embodiment has an improved accuracy in detecting a holding state of the operator's hand over steering wheel 2, vehicle 1 is allowed to properly give warning to the operator. This improves the safety of vehicle 1.

It should be noted that first wiring pattern 21A1 and second wiring pattern 21A2 are each configured of folds 21A4 coupled with one another at turns 21A5, and extend along X direction. Fold 21A4 extends in a manner that an angle between fold 21A4 and Y direction is smaller than an angle between fold 21A4 and X direction. In other words, fold 21A4 extends substantially in Y direction.

Thus, heater wire 26 can be prevented from being bent or cut even if wiring pattern 21A is pulled in X direction perpendicular to Y direction. Moreover, by providing the wire blocks, heater wire 26 can be prevented from being bent or cut by wiring pattern 21A being pulled in Y direction.

Moreover, folds 21A4 extend substantially in Y direction. Thus, the shape of wiring pattern 21A is hardly embossed into surface layer 21J of rim 21, thereby less affecting the aesthetics of steering wheel 2. Moreover, this makes the operator feel less uncomfortable with the embossed shape of wiring pattern 21A.

Moreover, since vehicle 1 includes the alerting devices such as loudspeaker 3 and display device 4, the operator can be warned to hold steering wheel 2 firmly, and consequently, traffic accidents can be reduced. It should be noted that in the present embodiment, the alerting devices are not limited to loudspeaker 3 and display device 4 and are devices which give warning to alert the operator of steering wheel 2.

Moreover, in the present embodiment, first controller 24 measures and processes the capacitance of wiring pattern 21A to convert the capacitance into an analog voltage signal and output, to second controller 8, first signal SG1 which is the capacitance converted into the analog voltage signal. Here, first controller 24 may output first signal SG1 which is the analog voltage signal having undergone digitization. First controller 24 may process the measured capacitance data to generate the analog voltage signal or the digital signal, and, further, determine a contact state between the operator's hand and steering wheel 2.

While as illustrated in FIG. 6, nonwoven fabric 21H is split into left-side nonwoven fabric portion 21HL and right-side nonwoven fabric portion 21HR and wiring pattern 21A is disposed on left-side nonwoven fabric portion 21HL and right-side nonwoven fabric portion 21HR in the present embodiment, it should be noted that the present invention is not limited to the configuration. Nonwoven fabric 21H may be split into three or more, and three or more wiring patterns 21A and three or more sensors 24S may be included accordingly. This configuration allows more accurate detection as to how much contact area with which the operator's hand is in contact with which part of steering wheel 2.

Moreover, while two nonwoven fabric portions 21HL and 21HR are used in the configuration in FIG. 6, wiring pattern 21A may be split into multiple portions and disposed on one nonwoven fabric 21H.

Moreover, while wiring pattern 21A according to the present embodiment is configured of one heater wire 26 which is repeatedly folded and disposed on nonwoven fabric 21H, heater wire 26 may be configured of plural number of wires, rather than one wire.

Moreover, in the present embodiment, sensor-side end 21AC and opposite end 21AD are provided at edges, in Y direction, of the wire blocks that are outermost in Y direction. However, the present invention is not limited to such a configuration. Sensor-side end 21AC and opposite end 21AD may be provided at edges, in X direction, of wire blocks that are outermost in Y direction.

Embodiment 2

Figure 10:
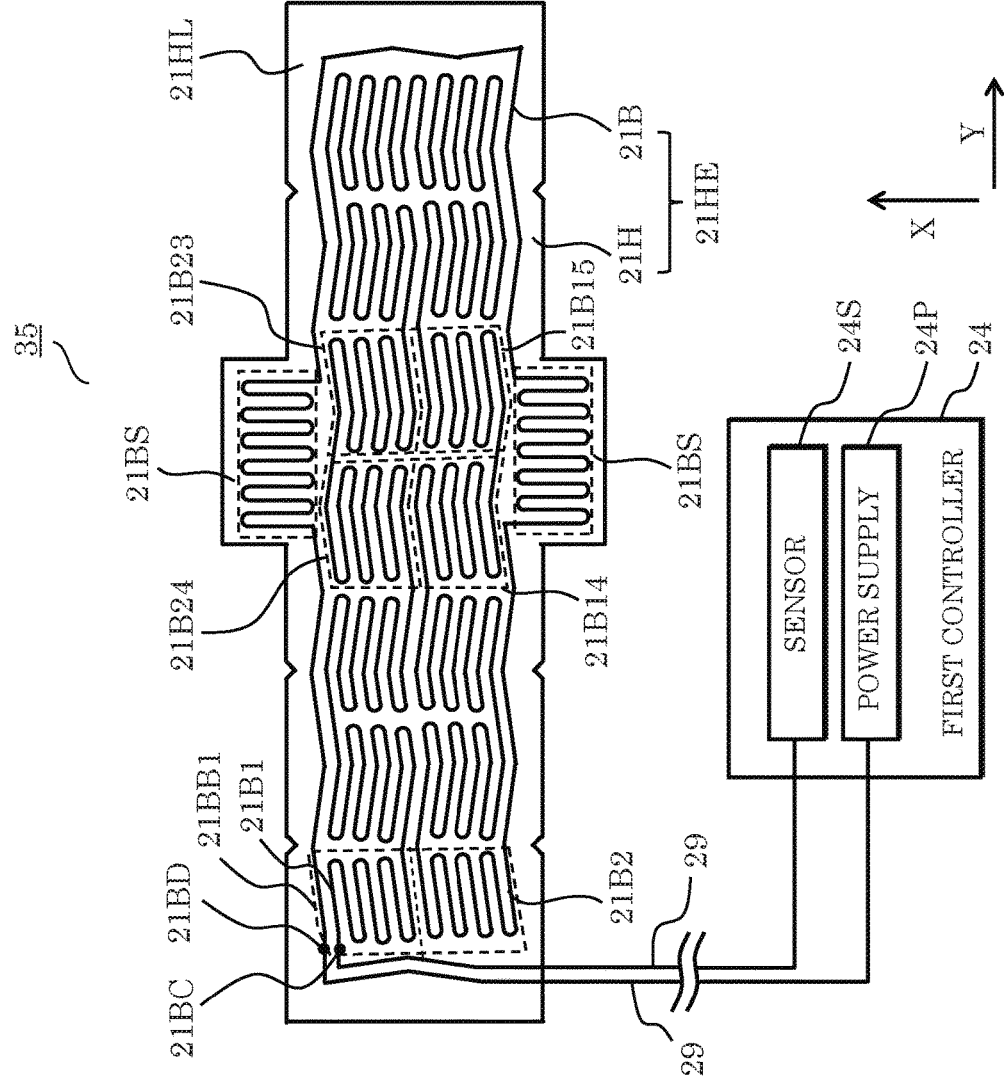
FIG. 10 is a diagram for illustrating wiring paths of a wiring pattern of a heater device according to Embodiment 2.
Figure 11:
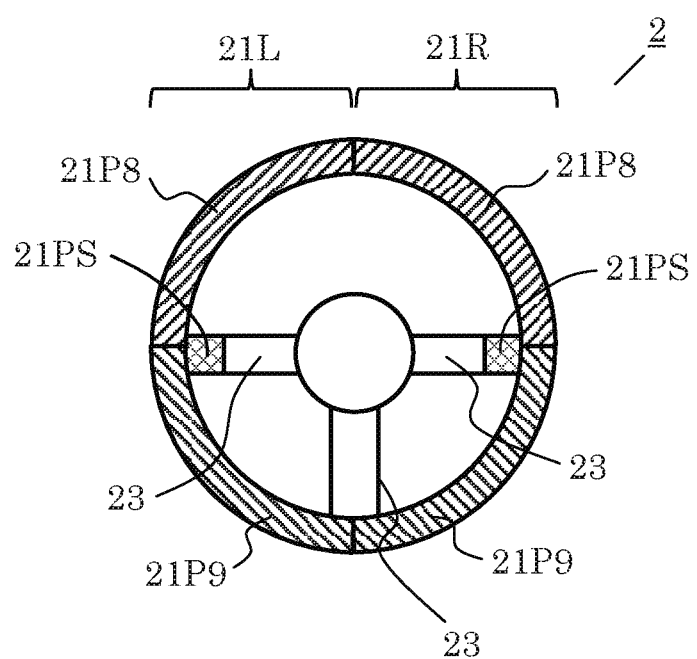
FIG. 11 is a diagram for illustrating of an embedded position, in a steering wheel, of the wiring pattern of the heater device according to Embodiment 2.

Embodiment 2 is described with reference to FIGS. 10 and 11. FIG. 10 is a diagram illustrating wiring pattern 21B and wiring paths from wiring pattern 21B to first controller 24 in heater device 35 according to the present embodiment. FIG. 11 is a diagram for illustrating which portion of wiring pattern 21B is embedded into which portion of steering wheel 2, showing the front-side face (surface facing an operator) of steering wheel 2.

Heater device 35 according to the present embodiment includes heater elements 21HE embedded in steering wheel 2, and sensor 24S. FIG. 10 illustrates heater element 21HE which is embedded in left portion 21L of steering wheel 2. Heater element 21HE includes left-side nonwoven fabric portion 21HL and wiring pattern 21B disposed on left-side nonwoven fabric portion 21HL.

In Embodiment 1, wiring pattern 21A is not embedded in spokes 23 included in steering wheel 2. In the present embodiment, wiring pattern 21B includes spoke-portion wiring pattern 21BS which is embedded in spokes 23, in addition to the wiring pattern as with Embodiment 1. The following mainly describes differences of Embodiment 2 from Embodiment 1, and aspects common to Embodiment 1 are not described or are simplified.

In FIG. 10, wiring pattern 21B includes two spoke-portion wiring patterns 21BS embedded in spoke 23. Spoke wiring pattern portion 21BS in the lower side of the figure is embedded in portion 21PS (see FIG. 11) of the front-side face of spokes 23. Spoke-portion wiring pattern 21BS in the upper side of the figure is embedded in portion 21PS of the back-side face of spokes 23 illustrated in FIG. 11. Spoke-portion wiring patterns 21BS warm spokes 23 to provide the operator with comfort holding of spokes 23.

The two spoke-portion wiring patterns 21BS are both closer to opposite end 21BD, than sensor-side end 21BC, along the wiring of wiring pattern 21B. For that reason, the sensitivity of sensor 24S to capacitances in spoke-portion wiring patterns 21BS is low. Thus, an amount of increase in capacitance detected by sensor 24S in spoke-portion wiring pattern 21BS when the operator's hand is being placed over spoke-portion wiring pattern 21BS is small. Thus, the effects of spoke-portion wiring patterns 21BS in second controller 8 determining whether the operator is firmly holding steering wheel 2 is small.

As with FIG. 6, wiring pattern 21B on right-side nonwoven fabric portion 21HR and wiring pattern 21B on left-side nonwoven fabric portion 21HL are in shapes that are line symmetry about the centerline of first controller 24. Wiring pattern 21B provided on right-side nonwoven fabric portion 21HR also includes two spoke-portion wiring patterns 21BS.

Moreover, spoke-portion wiring patterns 21BS are wiring patterns separate from wire blocks 21B14, 21B15, 21B23, and 21B24 adjacent thereto. Suppose that spoke-portion wiring patterns 21BS are eliminated and wire blocks 21B14 and 21B15 and wire blocks 21B23 and 21B24 are extended to the respective areas of spoke-portion wiring patterns 21BS to warm spokes 23. In the case, the pair of wire blocks 21B14 and 21B24, the pair of wire blocks 21B15 and 21B23 do not yield the same amount of increase in capacitance as the pairs of wire blocks even when the operator is holding the steering wheel in the same holding state. For that reason, how much contact area with which the operator's hand is in contact with steering wheel 2 cannot be detected accurately.

As illustrated in FIG. 11, steering wheel 2 includes three spokes 23 in the present embodiment. However, steering wheel 2 may include four spokes 23 two of which are on left portion 21L, and the other two of which are on right portion 21R. In this case, referring to FIG. 10, two spoke-portion wiring patterns 21BS are provided in the area of wiring pattern 21B on the upper side of the figure, and two spoke-portion wiring patterns 21BS are provided in the area of wiring pattern 21B on the lower side of the figure. Any number of spoke-portion wiring patterns 21BS may be used.

Embodiment 3

Figure 12:
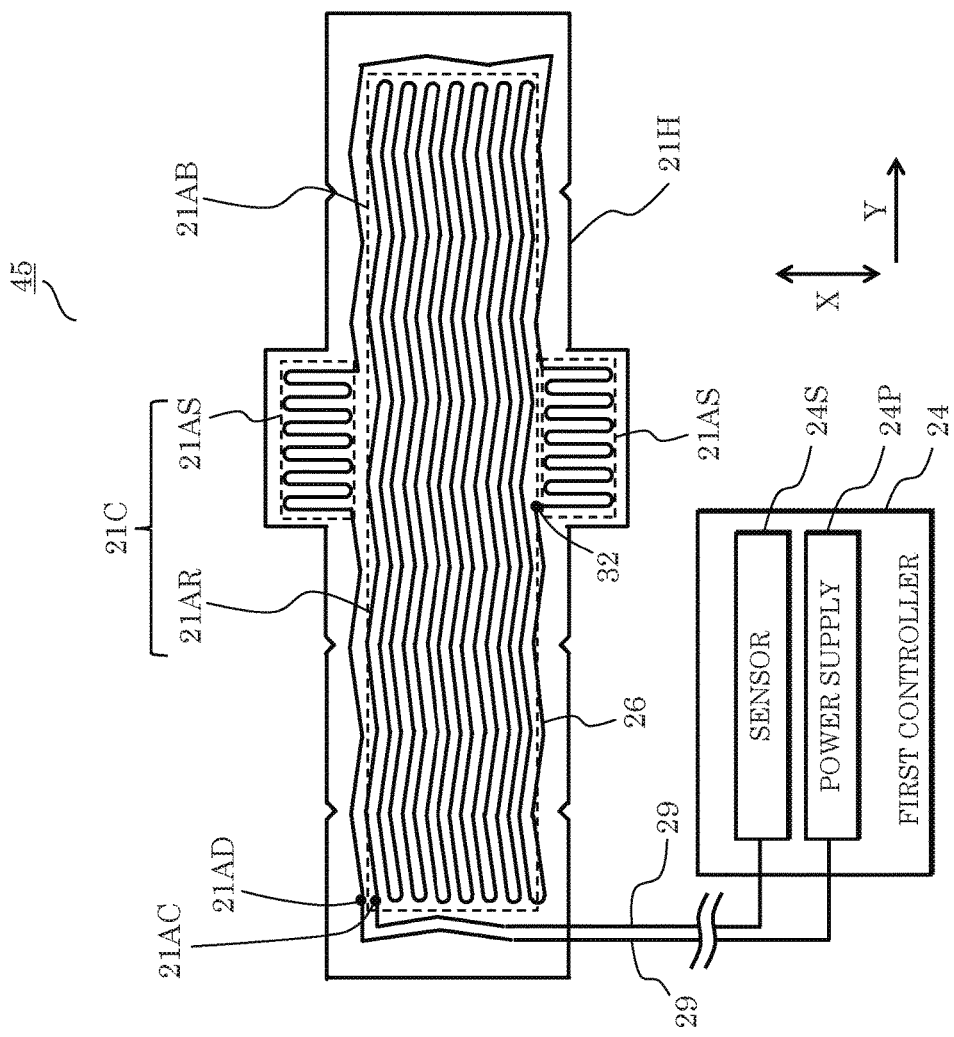
FIG. 12 is a diagram for illustrating wiring paths of the wiring pattern of a heater device according to Embodiment 3.

FIG. 12 is a diagram for illustrating a wiring path of wiring pattern 21C included in heater device 45 according to Embodiment 3 of the present invention. In the present embodiment, the same component as those in Embodiments 1 and 2 is referred to by the same reference sign and a detailed description thereof is omitted. Heater device 45 according to the present embodiment includes nonwoven fabric 21H (base member) which is embedded in rim 21 of steering wheel 2, wiring pattern 21C formed on nonwoven fabric 21H, and sensor 24S which measures capacitance of wiring pattern 21C. Wiring pattern 21C has rim-portion wiring pattern 21AR which is disposed on rim 21, and spoke-portion wiring patterns 21AS which are disposed on spokes 23 of steering wheel 2.

Rim-portion wiring pattern 21AR close to sensor 24S along the wiring of wiring pattern 21C is formed of heater wire 26 in a serpentine arrangement on nonwoven fabric 21H. Heater wire 26 is disposed repeatedly folded in Y direction and a direction opposite Y direction, while extending along X direction perpendicular to Y direction, the Y direction being the circumferential direction of rim 21. Heater wire 26 extends beyond end 32 that is the farthest away from sensor 24S in rim-portion wiring pattern 21AR, to form spoke-portion wiring pattern 21AS.

Such configuration increases the detection sensitivity of sensor 24S to the capacitance in rim-portion wiring pattern 21AR closer to sensor 24S along the wiring of wiring pattern 21C. On contrary, the detection sensitivity of sensor 24S to the capacitance in spoke-portion wiring pattern 21AS farther away from sensor 24S along the wiring of wiring pattern 21C is lower. Rim-portion wiring pattern 21AR is formed by heater wire 26 being repeatedly folded in substantially Y direction. Thus, as the operator holds steering wheel 2, the operator's hand comes in contact with a highly sensitive portion and a poorly sensitive portion of steering wheel 2 simultaneously. Consequently, the detection sensitivity is stabilized, irrespective of the holding position of the hand over steering wheel 2. Further, since steering wheel 2 further includes spoke-portion wiring patterns 21AS, heating of spokes 23 is allowed.

The following describes details of heater device 45 according to Embodiment 3. In FIG. 12, wiring pattern 21C formed of heater wire 26 is disposed on nonwoven fabric 21H which is embedded in rim 21. Wiring pattern 21C is formed by sewing heater wire 26 onto nonwoven fabric 21H. It should be noted that the base member is not limited to nonwoven fabric 21H and may be an insulative sheet having flexibility. Such a configuration may be applied to Embodiments 1 and 2.

As illustrated in FIG. 12, as compared to Embodiments 1 and 2, rim-portion wiring pattern 21AR closer to sensor 24S along the wiring of wiring pattern 21C is formed of one wire block 21AB. Heater wire 26 further extends from end 32 to form spoke-portion wiring pattern 21AS which is embedded in spoke 23, the end 32 being an opposite end from sensor-side end 21AC along the wiring of rim-portion wiring pattern 21AR. As illustrated in FIG. 12, in the present embodiment, two spoke-portion wiring patterns 21AS are formed on nonwoven fabric 21H. Heater wire 26 extending from end 32 forms spoke-portion wiring pattern 21AS in the lower side of the figure, forms spoke-portion wiring pattern 21AS in the upper side of the figure, and is terminated at opposite end 21AD.

Here, heater wire 26 may have one spoke-portion wiring pattern 21AS or may have three or more spoke-portion wiring patterns 21AS. In either case, heater wire 26 extending from end 32 forms spoke-portion wiring pattern 21AS. Spoke-portion wiring patterns 21AS allow heating of spoke 23.

Opposite end 21AD is connected to power supply 24P via connecting line 29 and power is supplied from power supply 24P to spoke-portion wiring pattern 21AS and rim-portion wiring pattern 21AR. It should be noted that the circuit included in sensor 24S and power supply 24P are commonly grounded, and thus the notation of the ground is omitted in FIG. 12.

Next, operation of heater device 45 having such a configuration is described in which heater device 45 detects whether an operator is holding the steering wheel.

As with the description with reference to FIG. 8, along the wiring of rim-portion wiring pattern 21AR, the detection sensitivity of sensor 24S to the capacitance at a location closer to sensor 24S is higher, whereas the detection sensitivity to the capacitance at a location farther away from sensor 24S is lower. Thus, heater wire 26 which forms rim-portion wiring pattern 21AR is snaked through in X direction in FIG. 12, and thus the detection sensitivity of sensor 24S to the capacitance at the upper leftmost portion of rim-portion wiring pattern 21AR in the figure is highest. As heater wire 26 forming rim-portion wiring pattern 21AR is snaked through, the detection sensitivity of sensor 24S to the capacitance at the leading end of rim-portion wiring pattern 21AR decreases. The detection sensitivity of sensor 24S to the lower leftmost portion of rim-portion wiring pattern 21AR in the figure is lowest. Spoke-portion wiring pattern 21AS is farther away from sensor 24S along the wiring of wiring pattern 21C than end 32 is, and thus the detection sensitivity of sensor 24S at spoke-portion wiring pattern 21AS is extremely low.

Although it is difficult for the operator to keep holding spokes 23, in the case where the detection sensitivity of sensor 24S at spoke-portion wiring pattern 21AS is increased, second controller 8 ends up erroneously determining that steering wheel 2 is being held. Hence, desirably, the detection sensitivity to the capacitance at spokes 23 is extremely low. In view of the above, spoke-portion wiring pattern 21AS is formed by heater wire 26 extending from end 32 of rim-portion wiring pattern 21AR. Consequently, false detections caused by a contact of the operator with spokes 23 can be reduced.

Since rim 21 is held by the fingers along X direction as the operator holds steering wheel 2, the operator's hand inevitably comes in contact with a highly sensitive portion and a poorly sensitive portion of rim-portion wiring pattern 21AR simultaneously. Consequently, the detection sensitivity of sensor 24S does not depend on a holding position of the hand. Moreover, the sensitivity of sensor 24S to the capacitance at spoke-portion wiring pattern 21AS is low, and thus when the hand is in contact with spoke 23 only, sensor 24S does not detect that steering wheel 2 is being held.

It should be noted that Embodiments 1 to 3 are merely illustrative and various modifications can also be made thereto. For example, second controller 8 may include a storage for long-term storage of data of first signal SG1. In recent years, what is called autonomous driving technology, which navigates vehicle 1 without an operator holding steering wheel 2 of vehicle 1, is actively developed. The autonomous driving technology for vehicle 1 utilizes video information obtained by a camera installed in vehicle 1, location information from global positioning system (GPS), distance information measured by a laser radar device, for example. The application of steering wheel 2 according to the present invention to such autonomous vehicle 1 allows later analysis of the holding state of the operator over steering wheel 2.

For example, in the case where autonomous vehicle 1 caused a traffic accident, a holding state of the operator over steering wheel 2 can be identified by analyzing the data of first signal SG1 stored in the storage. For that reason, chances increase in tracking down a cause of the accident after the accident, such as whether the accident is due to erroneous operation of steering wheel 2 and the operator of vehicle 1 is responsible for the accident, whether the accident is due to a bug in the autonomous driving program, or whether the other party at the accident scene is more responsible for the accident.

Embodiments 1, 2, and 3 disclose heater devices 25, 35, 45 characterized by the wiring pattern to detect a contact of the operator with steering wheel 2. This allows a contact of the operator with steering wheel 2 to be detected just by connecting sensor 24S to heater elements 21HE which heat steering wheel 2. In addition to this, the wiring pattern illustrated in the above embodiments can be used as a wiring pattern which is embedded in rim 21 and dedicated to detect a contact of the operator with steering wheel 2. In that case, such configuration differs from the configuration of the heater device and a grip sensor is configured, for example.

In that case, the grip sensor is disposed on a steering wheel and includes: a rim; the base member; a wiring pattern which is formed of one electrode wire and disposed on the base member; and a sensor which measures capacitance of the wiring pattern, the wiring pattern being the wiring pattern as illustrated in the above embodiments.

Embodiments 1, 2, and 3 have been described with reference to vehicle 1. In addition to this, the heater device according to the present invention is applicable to, for example, transport devices such as railways, aircrafts, and vessels for transporting individuals and cargoes, and steering wheels of such transport devices.

In the context of the present invention, the term "steering wheel" encompasses various types of steering grips/handles. Therefore, the present invention is not limited to the application to, for example, vehicles such as cars. Control sticks for aircrafts and helms for vessels also are within the technical scope of the steering wheel according to the present invention.

INDUSTRIAL APPLICABILITY

A heater device, a steering wheel, and a transport device which have improved accuracy in detecting a state in which an operator is holding the steering wheel are provided.

The invention claimed is:
1. A heater device disposed on a steering wheel which includes a rim, the heater device comprising:
   a base member attached to the rim;
   a heater wire disposed on the base member; and
   a sensor which is connected to one of a leading end and a trailing end of the heater wire and measures capacitance of the heater wire, wherein
   the heater wire forms a first wiring pattern and a second wiring pattern which are connected in series,
   the first wiring pattern and the second wiring pattern each include N wire blocks connected in series, where N is an integer greater than or equal to 2,
   the N wire blocks included in the first wiring pattern and the N wire blocks included in the second wiring pattern are (a) disposed along a first direction, which is a circumferential direction of the rim, in a manner that arrangement of the N wire blocks included in the first wiring pattern from the leading end of the heater wire to the trailing end and arrangement of the N wire blocks included in the second wiring pattern from the leading end of the heater wire to the trailing end are reversed, and (b) facing each other in a second direction perpendicular to the first direction, and among the N wire blocks included in the first wiring pattern and the N wire blocks included in the second wiring pattern, a sum of sensitivity of the sensor to capacitance of each of N pairs of wire blocks facing each other in the second direction is substantially same.

2. The heater device according to claim 1, wherein the wire blocks are arranged by the heater wire being repeatedly folded in the first direction and a direction opposite the first direction and extended in the second direction or a direction opposite the second direction.

3. The heater device according to claim 1, wherein the heater wire further forms a spoke wiring pattern disposed on a spoke of the steering wheel, in addition to the first wiring pattern and the second wiring pattern, the spoke wiring pattern being away from the one of the leading end and the trailing end of the heater wire which is connected to the sensor.

4. A steering wheel comprising the heater device according to claim 1.

5. The steering wheel according to claim 4, wherein the first wiring pattern of the heater device is disposed on a back side of the rim, the back side not facing an operator of the steering wheel.

6. A heater device which is disposed on a steering wheel which includes a rim and a spoke connected to the rim, the heater device comprising:
a base member;
a wiring pattern formed of a heater wire and disposed on the base member; and
a sensor which is connected to one of a leading end and a trailing end of the heater wire, and measures capacitance of the heater wire, wherein
the wiring pattern includes a spoke wiring pattern disposed on the spoke, and a rim-portion wiring pattern by the heater wire being repeatedly folded in a first direction, which is a circumferential direction of the rim, and a direction opposite the first direction and extended along a second direction perpendicular to the first direction or a direction opposite the second direction, and
the spoke wiring pattern is connected to the one of the leading end and the trailing end of the heater wire which is not connected to the sensor, and includes a first spoke wiring pattern and a second spoke wiring pattern which are connected in series and are in shapes that have line symmetry in the first direction.

7. A steering wheel comprising the heater device according to claim 6.

8. A transport device comprising the steering wheel according to claim 4.

9. The heater device according to claim 1, wherein among the N wire blocks included in the first wiring pattern, an amount of increase in capacitance decreases with an increased distance from the sensor relative to the heater wire for each of the N wire blocks, and among the N wire blocks included in the second wiring pattern, an amount of increase in capacitance decreases with an increased distance from the sensor relative to the heater wire for each of the N wire blocks.

10. The heater device according to claim 9, wherein the amount of increase in capacitance of each of the N wire blocks included in the first wiring pattern is greater than the amount of increase in capacitance of each of the N wire blocks included in the second wiring pattern.

11. The heater device according to claim 10, wherein a sum of the amount of increase in capacitance of each of the N pairs of wire blocks facing each other in the second direction is constant.

12. The heater device according to claim 6, wherein the rim-portion wiring pattern is in a shape that does not have line symmetry in the first direction.

* * * * *